US008315307B2

(12) United States Patent
Chen et al.

(10) Patent No.: US 8,315,307 B2
(45) Date of Patent: Nov. 20, 2012

(54) METHOD AND APPARATUS FOR FRAME PREDICTION IN HYBRID VIDEO COMPRESSION TO ENABLE TEMPORAL SCALABILITY

(75) Inventors: Peisong Chen, San Diego, CA (US); Vijayalakshmi R. Raveendran, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 1447 days.

(21) Appl. No.: 11/093,874

(22) Filed: Mar. 29, 2005

(65) Prior Publication Data

US 2005/0249285 A1    Nov. 10, 2005

Related U.S. Application Data

(60) Provisional application No. 60/560,433, filed on Apr. 7, 2004, provisional application No. 60/625,700, filed on Nov. 4, 2004.

(51) Int. Cl.
*H04N 7/12* (2006.01)

(52) U.S. Cl. .................................. 375/240.12

(58) Field of Classification Search .............. 375/240.12
See application file for complete search history.

(56) References Cited

U.S. PATENT DOCUMENTS

| | | | |
|---|---|---|---|
| 6,173,013 B1 | 1/2001 | Suzuki et al. | |
| 7,263,127 B1 * | 8/2007 | McVeigh et al. | ......... 375/240.15 |
| 7,599,438 B2 | 10/2009 | Holcomb et al. | |
| 7,606,308 B2 | 10/2009 | Holcomb et al. | |
| 2002/0044761 A1 * | 4/2002 | Takashima et al. | ............. 386/68 |
| 2003/0138043 A1 | 7/2003 | Hannuksela | ............. 375/240.08 |
| 2003/0142751 A1 * | 7/2003 | Hannuksela | ............. 375/240.25 |
| 2004/0028386 A1 * | 2/2004 | Walls et al. | ..................... 386/95 |
| 2004/0062304 A1 | 4/2004 | Dolbear et al. | .......... 375/240.01 |
| 2004/0196908 A1 * | 10/2004 | Lin et al. | .................. 375/240.15 |
| 2005/0074225 A1 * | 4/2005 | Lin et al. | ........................ 386/46 |
| 2005/0147167 A1 * | 7/2005 | Dumitras et al. | ........ 375/240.16 |

FOREIGN PATENT DOCUMENTS

| | | |
|---|---|---|
| GB | 2391413 A | 4/2004 |
| JP | 11088892 A | 3/1999 |
| JP | 2000350197 | 12/2000 |
| JP | 2003515987 T | 5/2003 |
| WO | WO0139503 A1 | 5/2001 |
| WO | WO03098475 A1 | 11/2003 |

OTHER PUBLICATIONS

Stephan Wenger, "Temporal Scalability Using P-Pictures for Low-Latency Applications", Dec. 7-9, 1998, pp. 559-564.

(Continued)

*Primary Examiner* — Jay Patel
*Assistant Examiner* — Richard Torrente
(74) *Attorney, Agent, or Firm* — Elaine Lo

(57) ABSTRACT

The invention is directed to a method and apparatus for providing temporal scaling frames for use in digital multimedia. The method involves using a removable unidirectional predicted temporal scaling frame communication along with intra-coded frames and/or inter-coded frames. The method involves the ability to selectively remove the temporal scaling frame(s) from being transmitted or decoded in order to satisfy, for example, power limits, data rate limits, computational limits or channel conditions. Examples presented include encoders, transcoders and decoders where the decision to drop the removable temporal scaling frames could be made.

33 Claims, 6 Drawing Sheets

OTHER PUBLICATIONS

International Search Report—PCT/US05/012132, International Searching Authority—European Patent Office, Aug. 9, 2005.
Written Opinion—PCT/US05/012132, International Searching Authority—European Patent Office, Aug. 9, 2005.
International Preliminary Report on Patentability—PCT/US05/012132—IPEA/US, Sep. 12, 2006.
Flierl M; Wiegand T; Girod B Ed—Institute of Electrical and Electronics Engineers: "Multihypothesis pictures for H.26L" Proc. 2001 Int. Conf. on Image Processing; 20011007; 20011007—20011010 Thessaloniki, Greece, vol. 3, Oct. 7, 2001, pp. 526-529, XP010563399.
Taiwan Search Report—TW094111031—TIPO—Jun. 21, 2011.

* cited by examiner

METHOD AND APPARATUS FOR FRAME PREDICTION IN HYBRID VIDEO COMPRESSION TO ENABLE TEMPORAL SCALABILITY

CLAIM OF PRIORITY UNDER 35 U.S.C. §119

The present Application for Patent claims priority to Provisional Application No. 60/560,433 entitled "METHOD AND APPARATUS FOR PREDICTION FRAME IN HYBRID VIDEO COMPRESSION TO ENABLE TEMPORAL SCALABILITY" filed Apr. 7, 2004 and Provisional Application No. 60/625,700 entitled "METHOD AND APPARATUS FOR PREDICTION FRAME IN HYBRID VIDEO COMPRESSION TO ENABLE TEMPORAL SCALABILITY" filed Nov. 4, 2004, and assigned to the assignee hereof and hereby expressly incorporated by reference herein.

BACKGROUND

1. Field

This invention relates to methods, apparatus and systems for distributing digital data encoded in a way to provide temporal scalability.

2. Background

Due to the explosive growth and great success of the Internet and wireless communication, as well as increasing demand for multimedia services, streaming media over the Internet and mobile/wireless channels has drawn tremendous attention. In heterogeneous Internet Protocol (IP) networks, video is provided by a server and can be streamed by one or more clients. Wired connections include dial-up, integrated services digital network (ISDN), cable, digital subscriber line protocols (collectively referred to as xDSL), fiber, local area networks (LAN), wide area networks (WAN) and others. The transmission mode can be either uni-cast or multi-cast. The variety of individual client devices, including personal digital assistant (PDA), laptop, desktop, set-top box, TV, HDTV, mobile phone and others, requires bitstreams of different bandwidths simultaneously for the same content. The connection bandwidth could vary quickly with the time (from 9.6 kbps to 100 Mbps and above), and can be faster than a server's reaction.

Similar to the heterogeneous IP network is mobile/wireless communication. Transport of multimedia content over mobile/wireless channels is very challenging because these channels are often severely impaired due to multi-path fading, shadowing, inter-symbol interference, and noise disturbances. Some other reasons such as mobility and competing traffic also cause bandwidth variations and loss. The channel noise and the number of users being served determine the time-varying property of channel environments. In addition to environmental conditions, the destination network can vary from second to third generation cellular networks to broadband data-only networks due to geographic location as well as mobile roaming. All these variables that affect the available bandwidth call for adaptive rate adjustment of the transmission of multimedia content, even on the fly. Thus, successful transmission of video over heterogeneous wired/wireless networks requires efficient coding, as well as adaptability to varying network conditions, device characteristics, and user preferences, while also being resilient to losses.

To meet different user requirements and to adapt to channel variation, one could generate multiple independent versions of bitstreams, each meeting one class of constraints based on transmission bandwidth, user display and computational capability, but this is not efficient for server storage and multicast application. In scalable coding, where a single macro-bitstream accommodating high-end users is built at the server, the bitstreams for low-end applications are just embedded as subsets of the macro-bitstream. As such, a single bitstream can be adapted to diverse application environments by selectively transmitting sub-bitstreams. Another advantage provided by scalable coding is for robust video transmissions on error prone channels. Error protection and error concealment can be easily handled. A more reliable transmission channel or a better error protection can be applied to base-layer bits that contain the most significant information.

There are spatial, temporal and signal to noise ratio (SNR) scalabilities in hybrid coders like MPEG-1, MPEG-2, MPEG-4 (collectively referred to as MPEG-x), H.261, H.262, H.263, and H.264 (collectively referred to as H.26x). In hybrid coding, temporal redundancy is removed by motion-compensated prediction (MCP). A video is typically divided into a series of groups of pictures (GOP), where each GOP begins with an intra-coded frame (I) followed by an arrangement of forward predicted frames (P) and bidirectional predicted frames (B). Both P-frames and B-frames are inter-frames. The B frame is the key to temporal scalability in most MPEG like coders. However, some profiles, such as the MPEG-4 Simple profile and the H.264 Baseline Profile do not support B frames.

In MPEG-4, profiles and levels provide a means of defining subsets of the syntax and semantics based on the decoder capabilities required to decode a particular bitstream. A profile is a defined sub-set of the entire bitstream syntax. A level is a defined set of constraints imposed on parameters in the bitstream. For any given profile, levels generally correspond to decoder processing load and memory capability. So profiles and levels specify restrictions on bitstreams and hence place limits on the capabilities of decoding the bitstreams. In general, a decoder shall be deemed to be conformant to a given profile at a given level if it is able to properly decode all allowed values of all syntactic elements as specified by that profile at that level.

It is an object of the present invention to provide a method and apparatus providing simple yet effective temporal scalability that also conforms to the MPEG-4 Simple Profile and the H.264 Baseline Profile. The MPEG-4 standard is described in ISO/IEC 14496-2. The H.264 standard is described in [ISO/IEC 14496-10]

SUMMARY

A coding scheme for providing temporal scalability in a video compression and delivery scheme such as MPEG-x or H.26x, and for providing temporal scalability for MPEG-4 Simple Profile and H.264 Baseline Profile conforming devices is described.

In one example, an encoder or a transcoder can create a single bitstream that can be adapted to provide for variable data rates and video quality for multiple users. The single bitstream can be created on the fly or stored in memory. Temporal scaling frames can be omitted from the video stream in order, for example, to meet bandwidth requirements, to satisfy channel conditions such as environmental noise or to deliver variable quality video.

In another example, a decoder can choose to omit decoding of temporal scaling frames to, for example, conserve battery power or decoding time.

DETAILED DESCRIPTION

In several communication systems, the data to be transmitted is compressed so that the available bandwidth is used more efficiently. For example, the Moving Pictures Experts Group (MPEG) has developed several standards relating to digital data delivery systems. The MPEG-4 standard was developed for low to high data rate channels that typically experience high loss of data. A similar Standard is H.264 developed by ITU-T Video Coding Experts Group (VCEG) together with ISO/IEC MPEG.

The MPEG-x and H.26x standards describe data processing and manipulation techniques that are well suited to the compression and delivery of video, audio and other information using fixed or variable length source coding techniques. In particular, the above-referenced standards, and other hybrid coding standards and techniques will compress video information using intra-frame coding techniques (such as, for example, run-length coding, Huffman coding and the like) and inter-frame coding techniques (such as, for example, forward and backward predictive coding, motion compensation and the like). Specifically, in the case of video processing systems, hybrid video processing systems are characterized by prediction-based compression encoding of video frames with intra-frame and/or inter-frame motion compensation encoding.

A method, apparatus and system to encode a video stream including intra-coded frames, forward and backward predicted frames and uni-directional predicted temporal scaling frames are described. Temporal scaling may take place at an originating device, at an intermediate device or at a receiving device during video delivery.

Intra-frame coding refers to encoding a picture (a field or a frame) without reference to any other picture, but the Intra-coded frame can be used as a reference for other frames. The terms "intra-frame", "intra-coded frame" and "I frame" are all examples of video-objects formed with intra-coding that are used throughout this application.

Inter or predictive coding refers to encoding a picture (a field or a frame) with reference to another picture. Compared to the Intra-coded frame, the Inter-coded or predicted frame may be coded with greater efficiency. Examples of inter-frames that will be used throughout this application are predicted frames (either forward or backward predicted, also referred to as "P frames"), bi-directional predicted frames (also referred to as "B frames") and uni-directional predicted temporal scaling frames (also referred to as "P* frames"). Other terms for inter-coding include high-pass coding, residual coding, motion compensated interpolation and others that are well known to those of ordinary skill in the art.

Figure 1A:
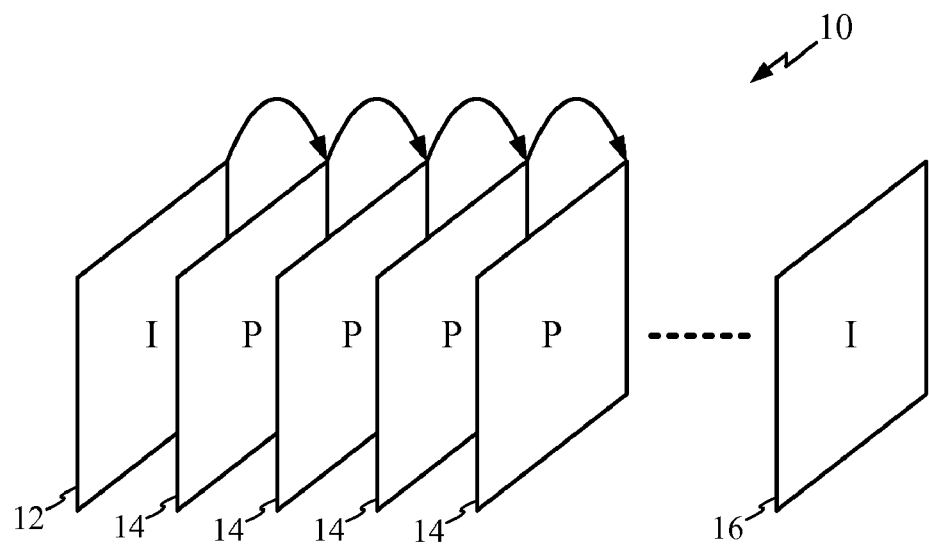
FIG. 1A is a diagram illustrating a conventional MPEG-4 Simple Profile data stream.

In a typical MPEG decoder, predictive coded pixel blocks (i.e., blocks that comprise one or more motion vectors and a residual error component) are decoded with respect to a reference frame (where an intra-frame or another predicted frame can serve as a reference frame). FIG. 1A is a diagram illustrating a conventional MPEG-4 Simple Profile data stream, which depicts frame dependencies for a GOP. GOP 10 is made up of initial I Frame 12, followed by several forward predicted P frames 14. The dependency of P frames on a previous I or P frame can limit the temporal scalability afforded to a system (systems such as those conforming to the MPEG-4 Simple and H.264 Baseline Profiles) that may only support forward predicted frames. Removing any of the P frames 14 may result in a loss of information that may be crucial in decoding other P frames. P frame removal may result in, for example, video jitter or the inability of the decoder to continue decoding until the next I frame 16, which marks the beginning of the next GOP.

Figure 1B:
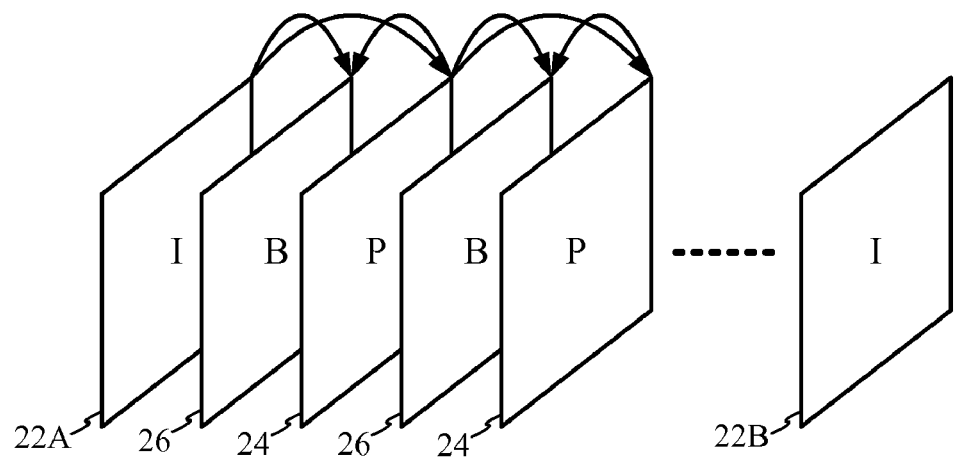
FIG. 1B is a diagram illustrating a conventional encoded data stream that enables temporal scalability.

One solution to the temporal scalability problem is the bi-directional predicted frame used in the prior art. FIG. 1B is a diagram illustrating a conventional encoded data stream that enables temporal scalability, which depicts the frame dependencies of a GOP. GOP 20 is made up of I frame 22A, forward predicted P frames 24, and bi-directional predicted B frames 26. Each B frame can combine forward and backward motion vectors and residual errors referenced to I frame 22A or forward predicted P frames 24 (backward predicted P frames could also be used but are not shown in this example). I frame 22B marks the beginning of the next GOP. As shown in FIG. 1B, only one B frame 26 is contained between I frame 22A and P frame 24 or between two P frames 24. Several B frames could be inserted between reference frames to allow for greater flexibility in temporal scalability. Since no other frames may depend on the B frame as a reference frame, one could remove B frames 26 without loss of information regarding the decoding of other frames. This characteristic of B frames 26 can allow B frames 26 to be inserted into a bitstream, where the B frames 26 can be removed at the option of an encoder, a transcoder or a decoder to accommodate channel conditions, bandwidth limitations, battery power as well as other considerations. For example, if there are three B frames between reference frames, then one could remove all three B frames and reduce the frame rate by three quarters or one could keep the B frame in the middle and remove the other two to reduce the frame rate by one half. The data rate could decrease accordingly.

Bi-directional prediction, although providing improved compression over forward (unidirectional) prediction alone, has a down side. Bi-directional prediction requires increased computational requirements. Bi-directional predicted frames can entail extra encoding complexity because macroblock matching (the most computationally intensive encoding process) may have to be performed twice for each target macroblock, once with the past reference frame and once with the future reference frame. Introducing B frames could also increase computational complexity at the decoder side and complicate the scheduling. This increase in complexity is a major reason that the MPEG-4 Simple Profile and H.264 Baseline Profile do not support bi-directional prediction. These profiles were developed for devices requiring efficient use of battery and processing power such as mobile phones, PDA's and the like. The present invention provides an effective way to offer temporal scalability to such power limited devices.

The present invention involves a unidirectional predicted temporal scaling frame, providing for temporal scalability without changing any syntax in the Simple Profile of MPEG-4 and the Baseline Profile of H.264. Unidirectional predicted temporal scaling frames use only a forward or backward prediction instead of both types of predictions as used by conventional B frames. In addition, no other predicted frame may be referenced to the unidirectional predicted temporal scaling frame. Since no other frame may depend on the temporal scaling frame, the temporal scaling frames can be removed from the bitstream without influencing the remaining frames. As a result there may be no need to introduce any extra syntax into the Simple Profile of MPEG-4 or the Baseline Profile of H.264. The addition of a single overhead bit can be used to identify a frame as a unidirectional predicted temporal scaling frame as opposed to a normal predicted frame.

Figure 2:
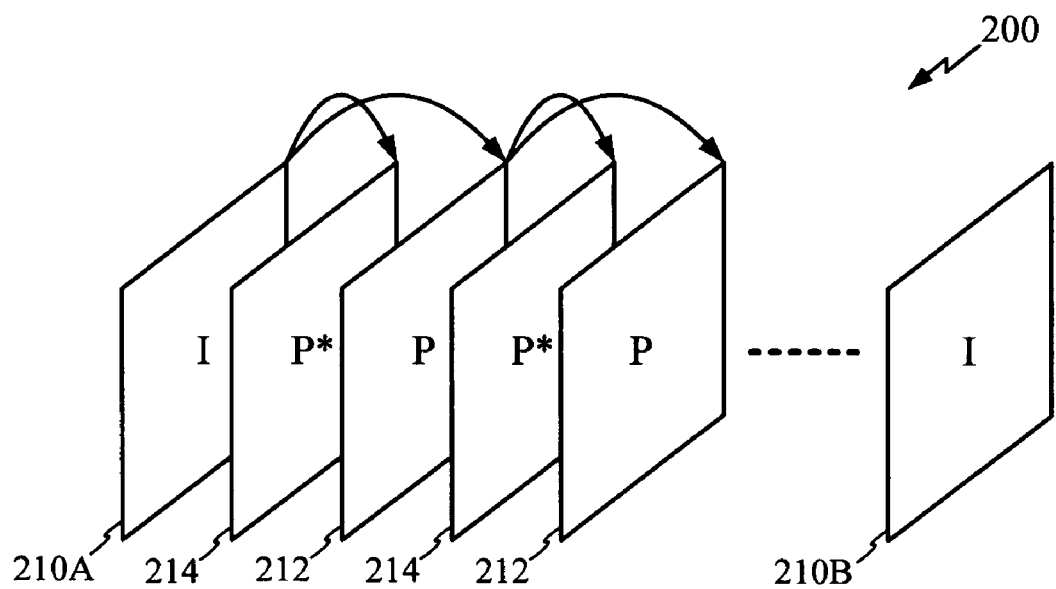
FIG. 2 is a diagram illustrating an example of a forward predicted temporal scalability scheme in accordance with the present invention.

FIG. 2 is a diagram illustrating an example of a forward predicted temporal scalability scheme in accordance with the present invention. GOP 200 includes I frame 210A, P frames 212, and temporal scalability frames 214. As shown in FIG. 2, a single forward predicted frame can be used as the unidirectional predicted temporal scaling P* frame 214 between successive P frames 212. It should be realized that multiple unidirectional temporal scaling frames could depend on a single reference frame. Having multiple temporal scaling frames between successive P frames 212 can allow for more adaptability to satisfy data rate requirements. I frame 210B marks the beginning of the next GOP.

Figure 3:
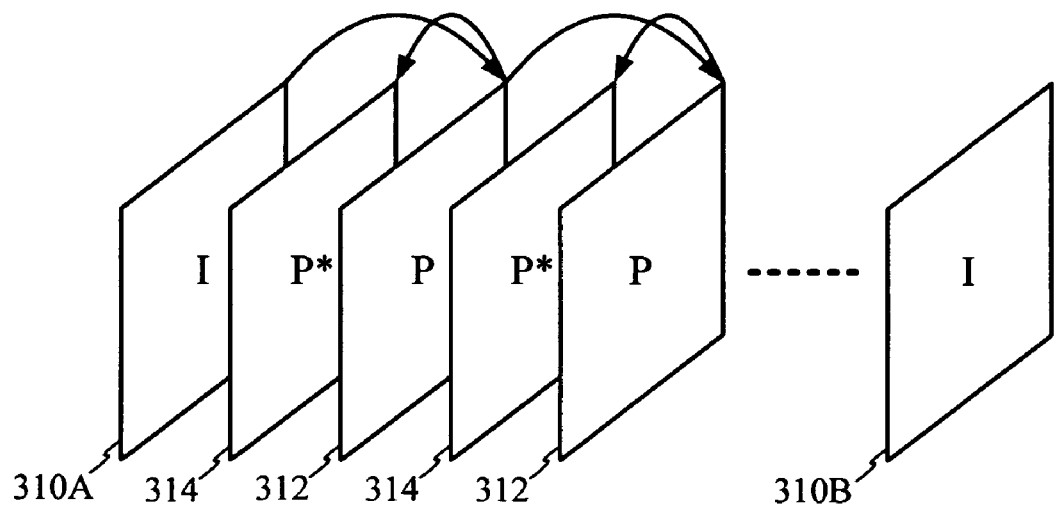
FIG. 3 is a diagram illustrating an example of a backward predicted temporal scalability scheme in accordance with the present invention.

FIG. 3 is a diagram illustrating an example of a backward predicted temporal scalability scheme in accordance with the present invention. GOP 300 includes I frame 310A, P frames 312 and temporal scaling frames 314. As shown in FIG. 3 a single backward predicted frame can be used as the unidirectional predicted temporal scaling P* frame 314 between successive P frames 312. I frame 310B marks the beginning of the next GOP. As seen in both backward and forward cases, no other frames reference the temporal scaling frames 214 and 314 respectively. Since no frames reference them, the temporal scaling frames can be omitted from encoding, transmission, or decoding without affecting any other frames. This may provide for a gradual reduction in quality and/or data rate, depending on the number of unidirectional predicted temporal scaling frames excluded from transmission/decoding.

Since the unidirectional predicted temporal scaling frames require less computation than B frames, the unidirectional predicted temporal scaling frames can be advantageous for use in power limited or computationally limited devices. Because a unidirectional predicted temporal scaling frame will not be used to predict following P frames, coding efficiency of P frames can go down compared to using only P frames. This drop in coding efficiency can be tolerated given the added benefit of having temporal scalability. The examples of unidirectional predicted temporal scaling frames presented in FIG. 2 and FIG. 3 reference only one frame. However, it can be recognized that more than one frame can be referenced by a unidirectionally predicted temporal scaling frame. Referencing more than one preceding or succeeding frame will increase the complexity of the computation, but may also reduce the size of the residual error.

Figure 4:
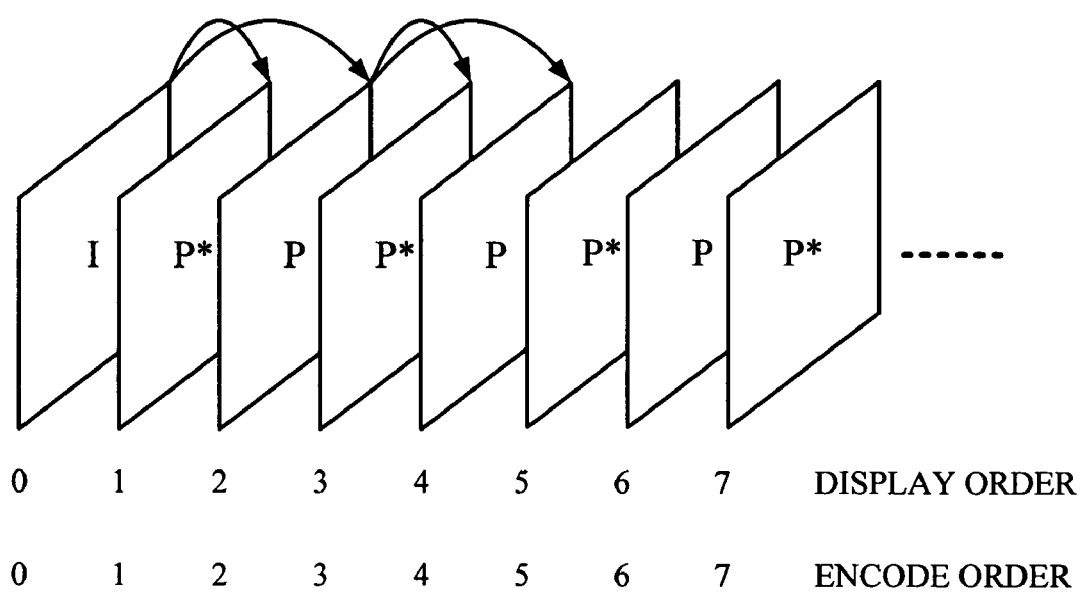
FIG. 4 is an illustration of an example of frame ordering for display and encoding processes using forward predicted unidirectional temporal scaling frames of the present invention.

In addition to the computational benefits, a shorter delay can be realized when using forward predicted unidirectional temporal scaling frames instead of the bi-directional frames. Bidirectional frames are encoded after the frame from which they are backward predicted from. This may mean that there is additional delay before the B frames can be displayed. FIG. 4 is an illustration of an example of frame ordering for display and encoding processes using forward predicted unidirectional temporal scaling frames of the present invention. As shown in FIG. 4, unlike bidirectional predicted frames, the unidirectionally predicted temporal scaling frames of the present invention can be encoded and transmitted in the same sequence as they will be displayed at the remote device. The ability to encode and transmit forward predicted unidirectional temporal scaling frames in sequence avoids the additional delays encountered when B frames are used, which can be an added benefit for applications such as video conferencing.

Figure 5:
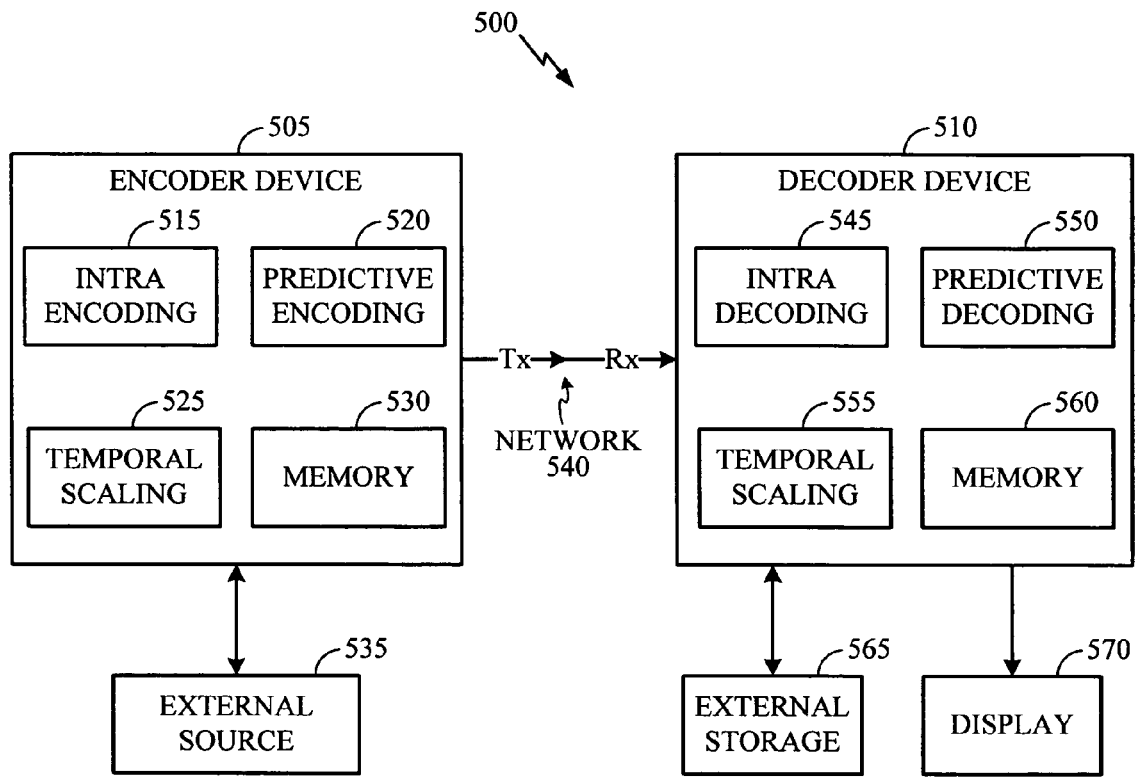
FIG. 5 is a block diagram of a general communications system for encoding and decoding streaming pictures.

FIG. 5 is a block diagram of a general communications system for encoding and decoding streaming pictures. The system 500 includes encoder device 505 and decoder device 510. Encoder device 505 further includes intra encoding component 515, predictive encoding component 520, temporal scaling component 525 and memory component 530. Encoder device 505 is able to access data from external source 535. External source 535 could be, for example, external memory, the Internet, or a live video and/or audio feed. The data contained in external source 535 can be in a raw (not encoded) or encoded state. Intra encoding component 515 is used to encode intra-coded frames. Predictive encoding component 520 is used to encode predicted frames of all kinds, including the unidirectional predicted temporal scaling frames. In addition to containing the logic used to encode the predicted frames, predictive encoding component 520 also contains the logic used to choose reference frames and the logic used to exclude temporal scaling frames from being referenced by other frames. Predictive encoding component 520 can access raw or encoded data for encoding. Encoded data can be accessed in order to replace normal P frames or I frames with unidirectional predicted temporal scaling frames. When accessing encoded data (either intra-coded or inter-coded data), the logic contained in intra encoding component 515 and predictive encoding component 520 decodes the encoded data resulting in reconstructed raw data. This reconstructed raw data can then be encoded as a unidirectional predicted temporal scaling frame (or any other type of frame).

After encoding, the encoded frames are stored in memory component 530 or external memory. The external memory can be the same as external source 535 or a separate memory component (not shown). The encoded frames are transmitted (Tx) over network 540. Network 540 can be wired or wireless. Temporal scaling component 525 contains logic to determine if temporal scaling is desired before transmission. Temporal scaling component 525 can also contain logic to identify the temporal scaling frames and to omit them from transmission if it is determined that temporal scaling is desired. The encoding process performed by the encoder device is more fully described below.

Decoder device 510 contains similar components to encoder device 505, including, intra decoding component 545, predictive decoding component 550, temporal scaling component 555 and memory component 560. Decoder device 510 can receive encoded data that has been transmitted over network 540 or from external storage 565. Intra decoding component 545 is used to decode intra-coded data. Predictive decoding component 550 is used to decode predicted data, including the unidirectional predicted temporal scaling frames. Temporal scaling component 555 contains logic to determine if temporal scaling is desired before decoding. In this example, Temporal scaling component 555 also contains logic to identify the temporal scaling frames and to omit them from decoding if it is determined that temporal scaling is desired. After decoding, the decoded frames can be displayed on display component 570 or stored in internal memory 560 or external storage 565. Display component 570 can be an integrated part of the decoding device, such as a display screen on a phone or PDA. Display component 570 could also be an external peripheral device. The decoding process performed by the decoder device is more fully described below.

The modifications to provide a decoder device to support unidirectional predicted temporal scaling frames can be minor. Since H.264 supports multi-reference coding, if the baseline decoder can support at lease two reference frames, there may be no need to modify the decoder to support unidirectional predicted temporal scaling frames. The decoder conforming to the simple profile of MPEG-4 may only allow one reference frame in the buffer, so after decoding a unidirectional forward predicted temporal scaling frame, the reference frame in the reference frame buffer would be maintained for the following P frame instead of replacing the reference frame in the buffer with the just decoded temporal scaling frame.

Figure 6:
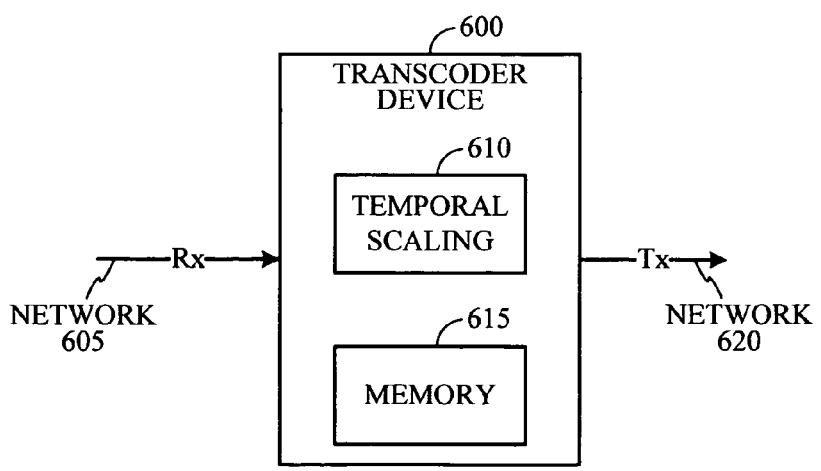
FIG. 6 is a block diagram of a transcoder device.

In addition to encoding and decoding devices, temporal scaling can take place at an intermediate device known as a transcoder. Referring to FIG. 6, there is illustrated a block diagram of a transcoder device. Transcoder device 600 is situated between first network 605 and second network 620. Transcoder device 600 receives encoded data from a device, such as encoder device 505 as depicted in FIG. 5, over first network 605. Transcoder device 600 stores the received data in a memory component 615. Transcoder device 600 also contains a temporal scaling component 610. Temporal scaling component 610 contains logic to determine if temporal scaling is desired before transmission on second network 620. Temporal scaling component 610 can also contain logic to identify the temporal scaling frames and to omit them from transmission if it is determined that temporal scaling is desired. The transcoding process performed by transcoder device 600 is more fully described below.

Figure 7:
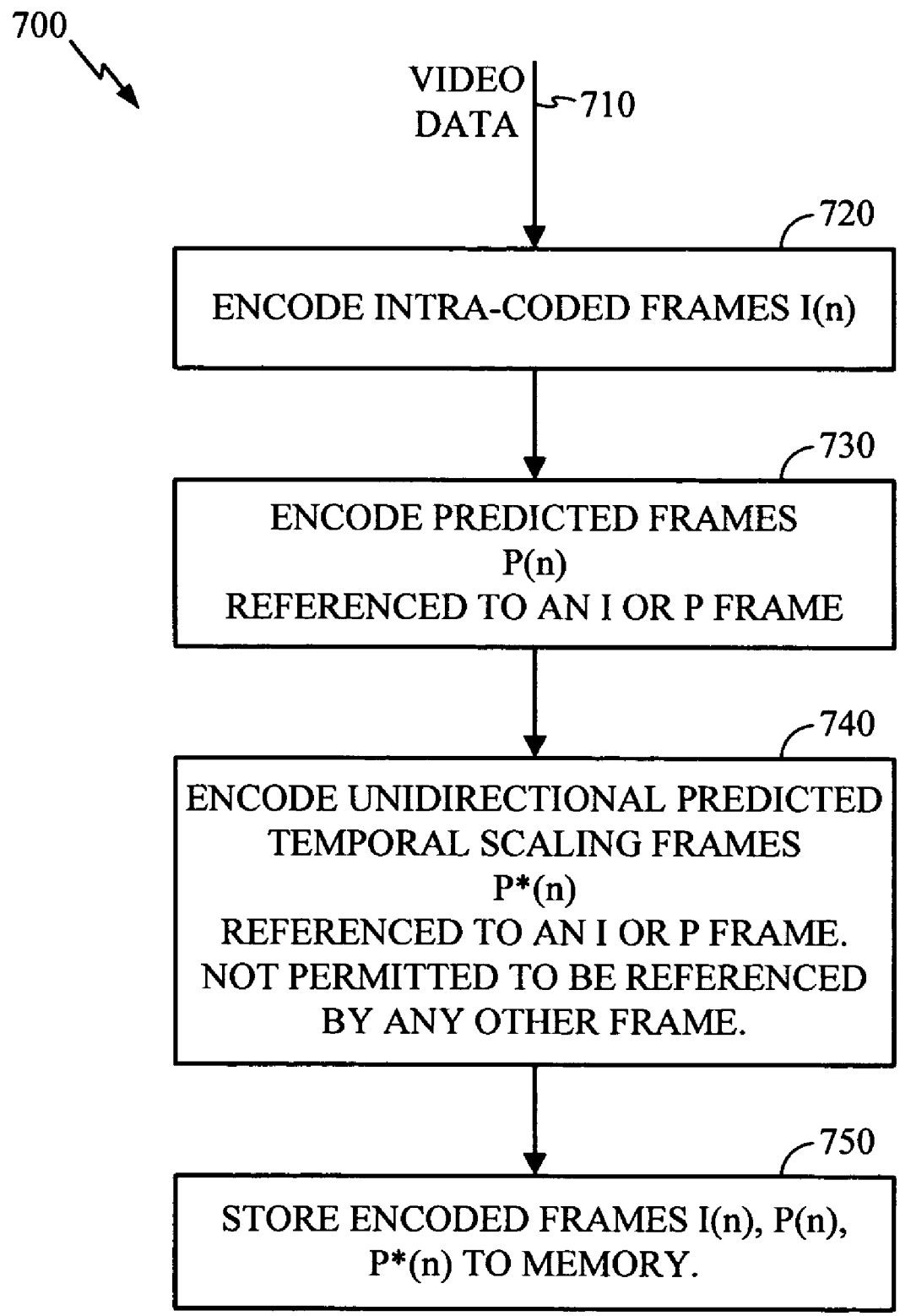
FIG. 7 is a flowchart illustrating one example of an encoding process including temporal scaling in accordance with the present invention.

FIG. 7 is a flowchart illustrating one example of an encoding process including temporal scaling in accordance with the present invention. The encoding process takes place in an encoder such as device 505 depicted in FIG. 5. Digital video data 710 is encoded into GOPs made up of a plurality of frames. A GOP can start with an Intra-coded Frame that is encoded at 720. The Intra-coded frame serves as a reference point for at least some of the inter-frames that follow (or precede in the case of backward prediction with open GOP, where an open GOP can reference frames from another GOP). The encoding process 700 also includes encoding of predicted frames 730 which can include forward or backward predicted frames. The predicted frames can contain motion compensation data such as motion vectors and residual error that can be referenced to a previous intra-coded or predicted frame. Predicted frames can also serve as reference frames for other predicted frames (both normal and temporal scaling frames). Encoding unidirectional predicted temporal scaling frames 740 enable temporal scalability. These frames can be computed in a manner similar to the predicted frames 730 in that the frames can contain motion compensation referenced to an intra-coded or predicted frame. The temporal scaling frames themselves, however, are excluded from being referenced by another frame (i.e. excluding the temporal scaling frame from being used for predicting any other frame). The temporal scaling frame data may also contain overhead information that identifies the frame as a temporal scaling frame. Because other frames do not depend on the existence of the temporal scaling frames, the temporal scaling frames can be removed without adversely affecting other frames. Encoded frames can be stored into memory 750 for delivery at a later time. Encoded frames could also be delivered after encoding without the storing step 750.

The encoding process 700 can continue to encode GOP's until the video data 710 is exhausted. The GOP's can be made up of different numbers of frames of different frame types in order to meet different objectives. Encoding a larger number of temporal scaling frames 740 in a GOP provides more flexibility in adjusting the quality or complexity of the delivery or decoding of that GOP.

Figure 8:
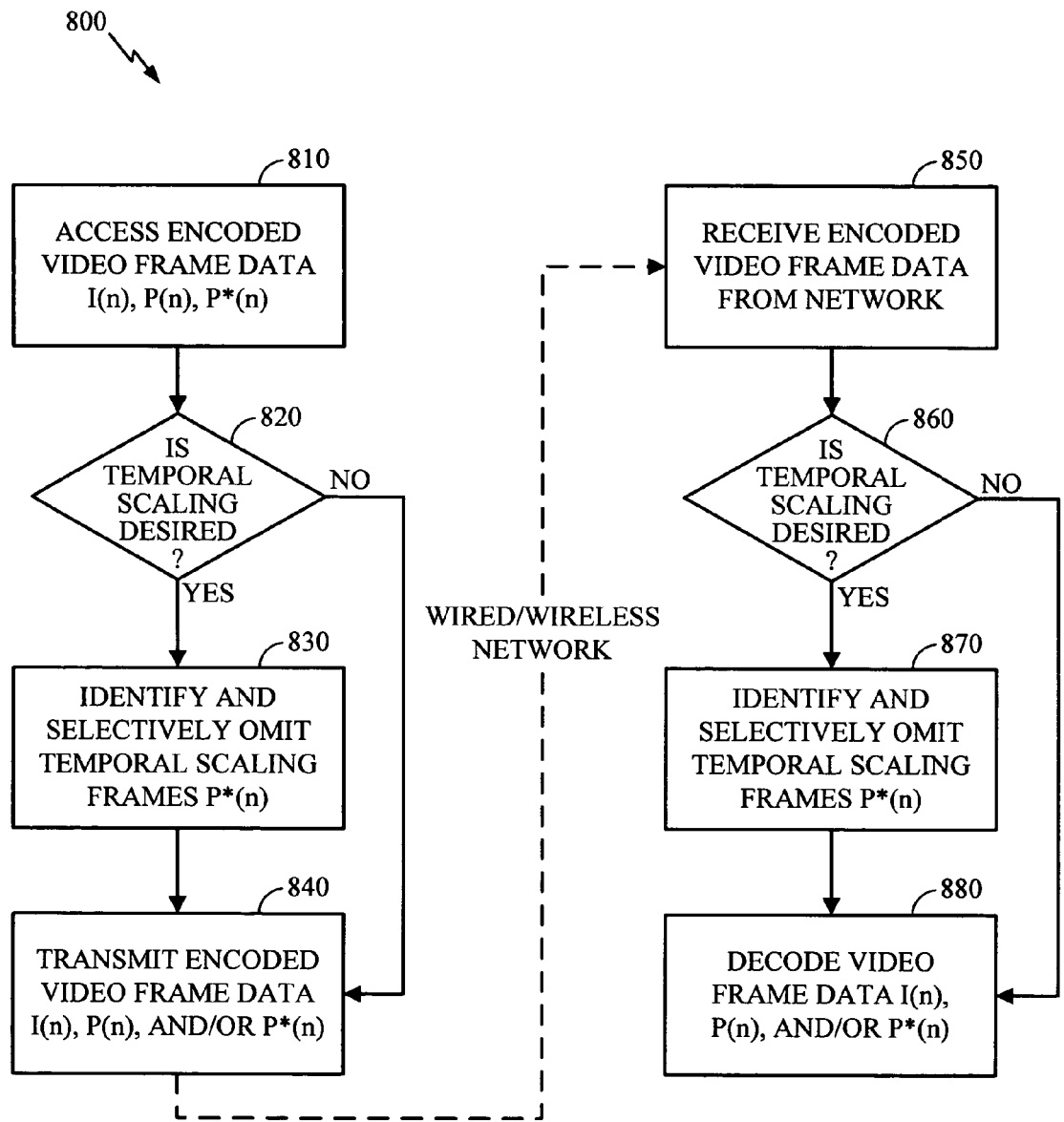
FIG. 8 is a flowchart of one example of a video delivery process including temporal scaling in accordance with the present invention.

FIG. 8 is a flowchart of one example of a video delivery process including temporal scaling in accordance with the present invention. The left side of FIG. 8 corresponds to a process in a video source, such as encoder device 505 depicted in FIG. 5, and the right side corresponds to a process in a destination device such as decoder device 510 depicted in FIG. 5. A wired/wireless network can connect the two sides and can be a combination of wired or wireless networks. Transitioning to new networks can include a transcoder device, such as transcoder device 600 depicted in FIG. 6. The process 800 in FIG. 8 starts by retrieving the video frame data from memory 810. This memory can be permanent memory that was created previously or it could also be dynamic memory to hold frame data that is being computed at the time of transmission.

A decision is made whether to temporally scale the video data 820. Factors considered in the decision can be, for example, providing a lower level of quality than the maximum, lowering the data rate below a maximum capability of one of the networks, controlling traffic, preserving battery power of a source or a destination device or limiting the time to encode and/or decode. If temporal scaling is to be performed then temporal scaling frames are identified and selectively removed 830 from the data stream. The removal of any of the unidirectional predicted temporal scaling frames will not affect any other frame because no frames are referenced to the temporal scaling frame. Identification can take many forms including, for example, a single overhead bit or flag that, when set equal to one, identifies the frame as a temporal scaling frame. This overhead bit or flag may be coded using standard compliant syntax or in a proprietary fashion. If the bitstream is to be standards (and profile) compliant, the temporal scaling frames could be identified through mutual a priori encoder-server communication (in case of network adaptation) or a mutual a priori encoder-decoder identifier (in case of device complexity/power adaptation). The mutual a priori identifier may be, for example, frame location (e.g. odd or even frame numbers), decoding or presentation timestamps or frame ordering. Another form of identification could involve the decoder using information in the bitstream regarding whether a frame is referenced by another frame. The video frames that are not removed are transmitted over the wired/wireless network(s) 840 to the destination device. There can be multiple destination devices in the case of multi-cast delivery or a single destination device in the case of uni-cast delivery.

At the destination device, a decoder such as decoder device 510 of FIG. 5, or at an intermediary network device, a router or transcoder such as device 600 of FIG. 6, the encoded video data is acquired from network 850. After acquiring the data, the destination device or the intermediary network device, respectively, can decide whether or not to provide temporal scaling 860. Reasons for temporal scaling can be similar to those at the video source, especially for an intermediate network router, with regard to network capability or network loading. Reasons for temporal scaling can also include, for example, preservation of battery power, especially for resource limited devices such as PDA's, mobile phones and the like. If temporal scaling is elected, then temporal scaling frames are identified and omitted to satisfy a targeted parameter, such as, for example, a data rate, or a decoding time. After omitting temporal scaling frames, the remaining frames can be decoded 880 in a manner determined by their type (e.g. intra-coded decoding, forward predicted decoding etc.).

The temporal scaling decision-making and removal processes discussed above can be performed at an encoder such as encoder device 505 (FIG. 5), a transcoder such as transcoder device 600 (FIG. 6), or a decoder such as decoder device 510 (FIG. 5). One or more of these three devices can be involved in deciding to remove temporal scaling frames in the same bitstream.

While, for the purpose of simplicity of explanation, the methodologies shown in FIGS. 7-8 are shown and described as a series of acts, it is to be understood and appreciated that the present invention is not limited by the order of acts, as some acts may, in accordance with the present invention, occur in different orders and/or concurrently with other acts from that shown and described herein.

Although the present invention has been fully described in connection with utilizing Intra-frames and forward predicted frames as reference frames for the unidirectional predicted temporal scaling frames, it is clear that other frames, such as backward predicted frames could serve as reference frames as well.

Although the present invention has been fully described in connection with MPEG-x and H.26x type compression schemes, it is clear that other video compression schemes can implement the methods of the present invention.

Aspects of the present invention include, but are not limited to, the descriptions below.

A method of encoding multimedia frames, comprising encoding a removable temporal scaling frame by unidirectionally predicting the removable temporal scaling frame, wherein the removable temporal scaling frame is not used for predicting any other frame.

An apparatus for encoding multimedia frames, comprising means for encoding a removable temporal scaling frame by unidirectionally predicting the removable temporal scaling frame, wherein the removable temporal scaling frame is not used for predicting any other frame.

An electronic device for encoding multimedia frames, the electronic device configured to encode a removable temporal scaling frame by unidirectionally predicting the removable temporal scaling frame, wherein the removable temporal scaling frame is not used to predict any other frame.

A computer readable medium having instructions for causing a computer to execute a method of encoding multimedia frames, comprising encoding an intra-coded frame, which is not predicted from another frame, encoding a predicted frame, wherein the predicted frame is predicted from at least one intra-coded or predicted frame, and encoding a removable temporal scaling frame by unidirectionally predicting the removable temporal scaling frame, wherein the removable temporal scaling frame is not used for predicting any other frame.

A method of decoding multimedia frames, comprising receiving encoded frame data, identifying any removable temporal scaling frame that is unidirectionally predicted, wherein the removable temporal scaling frame is not used for the prediction of any other frame, and decoding the received encoded frame data so as to omit at least one removable temporal scaling frame from being decoded.

An apparatus for decoding multimedia frames, comprising means for receiving encoded frame data, means for identifying any removable temporal scaling frame that is unidirectionally predicted, wherein the removable temporal scaling frame is not used for the prediction of any other frame, and means for decoding the received encoded frame data so as to omit at least one removable temporal scaling frame from being decoded.

An electronic device for decoding multimedia frames, the electronic device configured to receive encoded frame data, to identify any removable temporal scaling frame that is unidirectionally predicted, wherein the removable temporal scaling frame is not used for the prediction of any other frame, and to decode the received encoded frame data so as to omit at least one removable temporal scaling frame from being decoded.

A computer readable medium having instructions for causing a computer to execute a method of decoding multimedia frames, comprising receiving encoded frame data, identifying any removable temporal scaling frame that is unidirectionally predicted, wherein the removable temporal scaling frame is not used for the prediction of any other frame, and decoding the received encoded frame data so as to omit at least one removable temporal scaling frame from being decoded.

A method of temporally scaling multimedia frames, comprising receiving an encoded frame over a first network, receiving a removable temporal scaling frame over the first network, wherein the removable temporal scaling frames is unidirectionally predicted from at least one encoded frame and the removable temporal scaling frame is not used for predicting any other frame, transmitting the received encoded frame over a second network, and omitting the removable temporal scaling frame from transmission.

An apparatus for temporally scaling multimedia frames, comprising means for receiving an encoded frame over a first network, means for receiving a removable temporal scaling frame over the first network, wherein the removable temporal scaling frames is unidirectionally predicted from at least one encoded frame and the removable temporal scaling frame is not used for predicting any other frame, means for transmitting the accessed encoded frame over a second network, and means for omitting the removable temporal scaling frame from transmission.

Those of ordinary skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of ordinary skill would further appreciate that the various illustrative logical blocks, modules, and algorithm steps described in connection with the examples disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the examples disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the examples disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an Application Specific Integrated Circuit (ASIC). The ASIC may reside in a wireless modem. In the alternative, the processor and the storage medium may reside as discrete components in the wireless modem.

The previous description of the disclosed examples is provided to enable any person of ordinary skill in the art to make or use the present invention. Various modifications to these examples will be readily apparent to those skilled in the art, and the principles defined herein may be applied to other examples without departing from the spirit or scope of the invention.

A method, apparatus and system to encode, transcode and decode a video stream including intra-coded frames, forward and backward predicted frames and uni-directional predicted temporal scaling frames have been described.

The invention claimed is:

1. A method in an encoder of encoding multimedia frames in a bitstream, comprising:
   encoding one or more removable temporal scaling multimedia frames in the bitstream by unidirectionally backward predicting all of the removable temporal scaling multimedia frames in the bitstream with respect to a display order;
   encoding the removable temporal scaling multimedia frames with overhead data for identification of a multimedia frame by a decoder as a removable temporal scaling multimedia frame, wherein the removable temporal scaling multimedia frames are encoded so as to be removable by the decoder based on the overhead data in order to temporally scale a data rate of the bitstream; and
   encoding all of the multimedia frames including the removable temporal scaling multimedia frames into the bitstream without using any of the removable temporal scaling multimedia frames to predict the multimedia frames,
   wherein the method is performed by one or more processors of the encoder.

2. The method of claim 1, further comprising:
   encoding at least one of the other multimedia frames as an intra-coded frame, which is not predicted from another frame.

3. The method of claim 2, further comprising:
   encoding at least one of the other multimedia frames as a predicted frame, wherein the predicted frame is predicted from at least one intra-coded or predicted frame.

4. The method of claim 3, wherein, the encoding of the predicted frame comprises forward predicting the predicted frame.

5. The method of claim 3, further comprising:
   transmitting the encoded frames over a network.

6. The method of claim 5, further comprising:
   receiving the transmitted frames; and
   decoding the received frames.

7. The method of claim 5, further comprising:
   receiving the transmitted frames;
   decoding the received intra-coded frame and the received predicted frame, while omitting the received removable temporal scaling multimedia frames.

8. The method of claim 5, further comprising:
   receiving the transmitted frames; and
   identifying each of the received removable temporal scaling multimedia frames with an a priori identifier.

9. The method of claim 3, further comprising:
   transmitting the encoded intra-coded frame and the encoded predicted frame over a network, while omitting the encoded removable temporal scaling multimedia frames from the transmission.

10. The method of claim 3, further comprising:
    encoding the predicted frame with motion vector and residual error data; and
    encoding the removable temporal scaling multimedia frames with motion vector and residual error data.

11. The method of claim 1, further comprising:
    storing the encoded frames in memory.

12. An electronic device for encoding multimedia frames in a bitstream, the electronic device configured to:
    encode one or more removable temporal scaling multimedia frames in the bitstream by unidirectionally backward predicting all of the removable temporal scaling multimedia frames in the bitstream with respect to a display order,
    encode the removable temporal scaling multimedia frames with overhead data for identification of a multimedia frame by a decoder as a removable temporal scaling multimedia frame, wherein the removable temporal scaling multimedia frames are encoded so as to be removable by the decoder based on the overhead data in order to temporally scale a data rate of the bitstream, and
    encode all of the multimedia frames including the removable temporal scaling multimedia frames into the bitstream without using any of the removable temporal scaling multimedia frames to predict the multimedia frames.

13. The electronic device of claim 12, further configured to encode at least one of the other multimedia frames as an intra-coded frame, which is not predicted from another frame.

14. The electronic device of claim 13, further configured to encode at least one of the other multimedia frames as a predicted frame, wherein the predicted frame is predicted from at least one intra-coded or predicted frame.

15. The electronic device of claim 14, further configured to encode the predicted frame by use of forward prediction.

16. The electronic device of claim 14, further configured to transmit the encoded frames over a network.

17. The electronic device of claim 14, further configured to transmit the encoded intra-coded frame and the encoded predicted frame over a network, and to omit the encoded removable temporal scaling multimedia frames from the transmission.

18. The electronic device of claim 14, further configured to encode the predicted frame with motion vector and residual error data, and to encode the removable temporal scaling multimedia frames with motion vector and residual error data.

19. The electronic device of claim 12, further configured to store the encoded frames in memory.

20. A non-transitory computer readable medium having instructions for causing a computer to execute a method of encoding multimedia frames according to the method of claim 1.

21. A method in a decoder of decoding multimedia frames, comprising:
receiving encoded frame data including one or more removable temporal multimedia frames in a bitstream and other multimedia frames in the bitstream, wherein all of the removable temporal multimedia frames in the bitstream are unidirectionally backward predicted with respect to a display order, wherein the removable temporal scaling multimedia frames are encoded with overhead data for identification of a multimedia frame as a removable temporal scaling multimedia frame, wherein the multimedia frames including the removable temporal multimedia frames are encoded without using any of the removal temporal scaling multimedia frames to predict the multimedia frames, and wherein the removable temporal scaling multimedia frames are encoded so as to be removable in order to temporally scale a data rate of the bitstream;
identifying at least one of the removable temporal scaling multimedia frames that is unidirectionally predicted based on the overhead data; and
decoding the received encoded frame data so as to omit at least one of the removable temporal scaling multimedia frames from being decoded,
wherein the method is performed by one or more processors of the decoder.

22. The method of claim 21, further comprising:
receiving with the encoded frame data at least one intra-coded frame, which is not predicted from another frame; and
decoding the intra-coded frame.

23. The method of claim 22, further comprising:
receiving with the encoded frame data at least one predicted frame, wherein the predicted frame is predicted from at least one encoded frame; and
decoding the predicted frame.

24. The method of claim 23, further comprising:
receiving one of the predicted frames that is forward predicted.

25. The method of claim 21, wherein the step of receiving comprises receiving over a wireless network.

26. The method of claim 21, further comprising:
identifying each of the received removable temporal scaling multimedia frames with an a priori identifier.

27. An electronic device for decoding multimedia frames, the electronic device configured to:
receive encoded frame data in a bitstream including one or more removable temporal multimedia frames, wherein all of the removable temporal multimedia frames are unidirectionally backward predicted with respect to display order and other multimedia frames in a bitstream, wherein the removable temporal scaling multimedia frames are encoded with overhead data for identification of a multimedia frame as a removable temporal scaling multimedia frame, wherein the multimedia frames including the removable temporal multimedia frames are encoded without using any of the removal temporal scaling multimedia frames to predict the multimedia frames, and wherein the removable temporal scaling multimedia frames are encoded so as to be removable in order to temporally scale a data rate of the bitstream;
identify at least one of the removable temporal scaling multimedia frames that is unidirectionally predicted based on the overhead data; and
decode the received encoded frame data so as to omit at least one of the removable temporal scaling multimedia frames from being decoded.

28. The electronic device of claim 27, further configured to receive with the encoded frame data at least one intra-coded frame, which is not predicted from another frame, and to decode the intra-coded frame.

29. The electronic device of claim 28, further configured to receive with the encoded frame data at least one predicted frame, wherein the predicted frame is predicted from at least one encoded frame, and to decode the predicted frame.

30. The electronic device of claim 29, further configured to receive one of the predicted frames that is forward predicted.

31. The electronic device of claim 29, further configured to identify each of the received removable temporal scaling multimedia frames with an a priori identifier.

32. The electronic device of claim 27, further configured to receive the encoded frame data over a wireless network.

33. A non-transitory computer readable medium having instructions for causing a computer to execute a method of decoding multimedia frames according to claim 21.

* * * * *